(12) United States Patent
Archdale

(10) Patent No.: US 12,264,003 B2
(45) Date of Patent: Apr. 1, 2025

(54) CABLE TIE

(71) Applicant: Robert Gerald Archdale, London (GB)

(72) Inventor: Robert Gerald Archdale, London (GB)

(73) Assignee: Bendy Cable Ties Ltd., London (GB)

( * ) Notice: Subject to any disclaimer, the term of this patent is extended or adjusted under 35 U.S.C. 154(b) by 513 days.

(21) Appl. No.: 17/686,100

(22) Filed: Mar. 3, 2022

(65) Prior Publication Data

US 2023/0278766 A1  Sep. 7, 2023

(51) Int. Cl.
*B65D 63/10* (2006.01)
*H02G 1/00* (2006.01)
*H02G 3/04* (2006.01)

(52) U.S. Cl.
CPC ........... *B65D 63/1027* (2013.01); *H02G 1/00* (2013.01); *H02G 3/0456* (2013.01)

(58) Field of Classification Search
CPC ..... B65D 63/1027; H02G 1/00; H02G 3/0456
See application file for complete search history.

(56) References Cited

U.S. PATENT DOCUMENTS

| | | | | |
|---|---|---|---|---|
| 7,753,321 B2 * | 7/2010 | Geiger | ................... | F16L 3/2334 248/68.1 |
| 7,934,296 B2 * | 5/2011 | Okamoto | ........... | B65D 63/1027 24/339 |
| 2003/0070263 A1 * | 4/2003 | Mohnke | ............. | B65D 63/1063 24/16 PB |
| 2007/0009220 A1 * | 1/2007 | Jadaud | .................. | H02G 3/0437 385/135 |
| 2008/0028576 A1 * | 2/2008 | Okamoto | ........... | B65D 63/1027 24/16 R |
| 2017/0113857 A1 * | 4/2017 | Berglund | ................ | G09F 3/037 |

* cited by examiner

*Primary Examiner* — Anita M King
(74) *Attorney, Agent, or Firm* — Weiss & Moy, PC; Jeffrey D. Moy

(57) ABSTRACT

A cable tie comprises a strap has a lock at a first end and a second end configured to be threaded through the lock such that teeth on the strap are engaged by the lock. The strap has a first portion extending from the lock and a second portion joined to the first portion by a pre-formed curve in the strap. The second portion extends from the curve to the second end, with at least a distal section of the second portion adjacent the second end being angled away from the first portion at an acute angle. When measured parallel to the longitudinal axis of the first portion there is a first distance between the curve's turning point and the first end of the strap and a second distance between the curve's turning point and the second end of the strap. The first distance is at least 5 times greater than the second distance.

14 Claims, 6 Drawing Sheets

CABLE TIE

The present invention relates to a cable tie. In particular the present invention relates to a cable tie specifically adapted for use with cable trays.

Cable trays are used to support insulated electrical cables used for power distribution, control, and communication. Normally cable ties are used to secure electrical cables to cable trays.

However, threading cable ties through holes on cable trays is time-consuming work. This problem can be compounded by cable trays being affixed to surfaces such as walls by brackets such that there is little space behind the cable tray for a user to manoeuvre a cable tie through a first aperture and out of a second aperture.

Cable ties having a preformed shape have been previously disclosed, for example in KR20100091144 and JP2011259603. However, such prior art cable ties are not particularly versatile and do not function well with cable trays.

The present invention seeks to improve upon the prior art.

According to a first aspect of the present invention there is provided a cable tie comprising:
  a strap having a lock at a first end and a second end configured to be threaded through the lock such that teeth on the strap are engaged by the lock;
  the strap having a first portion extending from the lock and a second portion joined to the first portion by a pre-formed curve in the strap; characterized by:
  the second portion extending from the curve to the second end, with at least a distal section of the second portion adjacent the second end being angled away from the first portion at an acute angle; wherein
  when measured parallel to the longitudinal axis of the first portion there is a first distance between the curve's turning point and the first end of the strap and a second distance between the curve's turning point and the second end of the strap;
  the first distance is at least 5 times greater than the second distance.

Advantageously, by providing the majority of the length of cable tie in the first portion very little of the cable tie must be fed through a first aperture in order for the second end to be located such that it protrudes out of a second aperture for a user to grasp. This is especially beneficial when the space behind the aperture is limited, for example if the apertures are formed in a cable tray and the cable tray is mounted to a surface by means of stand off brackets. Furthermore having at least a distal end of the second portion angled to the first portion allows for the tie to reach between slots of different spacings.

In some embodiments the first distance is at least 6 times, at least 7 times, at least 8 times, at least 9 times or at least 10 times greater than the second distance.

In some embodiments the distance between the second end and the first portion when measured in a direction substantially perpendicular to the longitudinal axis of the first portion is between 3 and 5 cm, or is between 3.5 and 4.5 cm, or is around 4 cm.

In some embodiments the second distance is between 1 and 5 cm, or is between 2 and 4 cm, or is between 2.5 and 3.5 cm, or is around 3 cm.

In some embodiments the first distance is between 20 and 40 cm, is between 25 and 35 cm, or is around 30 cm.

In some embodiments the second portion is angled to the first portion at an acute angle of less than 75 degrees, or of less than 60 degrees, or of less than 45 degrees, or of less than 30 degrees, or of less than 25 degrees.

In some embodiments the second portion is angled to the first portion at an acute angle of around 25 degrees.

In some embodiments the second portion is angled to the first portion at an acute angle of more than 10 degrees, more than 15 degrees, or more than 20 degrees.

In some embodiments the first portion is joined to the second portion by a U-shaped curve or a V-shaped curve.

In some embodiments a distal section of the second portion adjacent the second end is substantially linear.

In some embodiments at least 25% of the second portion is substantially linear, at least 50% of the second portion is substantially linear or at least 75% of the second portion is substantially linear.

In some embodiments the second portion is substantially linear.

According to a second aspect of the present invention there is provided a method of securing a cable to a cable tray comprising the steps of:
  providing a cable tie made in accordance with any preceding statement of invention;
  inserting the free end of the cable tie through first and second apertures on the cable tray;
  threading the second end of the cable tie through the lock.

In some embodiments the cable tray is attached to a surface by means of stand off brackets.

In order that the present invention may be more fully understood a specific embodiment will now be described by way of example with reference to the accompanying schematic drawings, of which:

Figure 1:
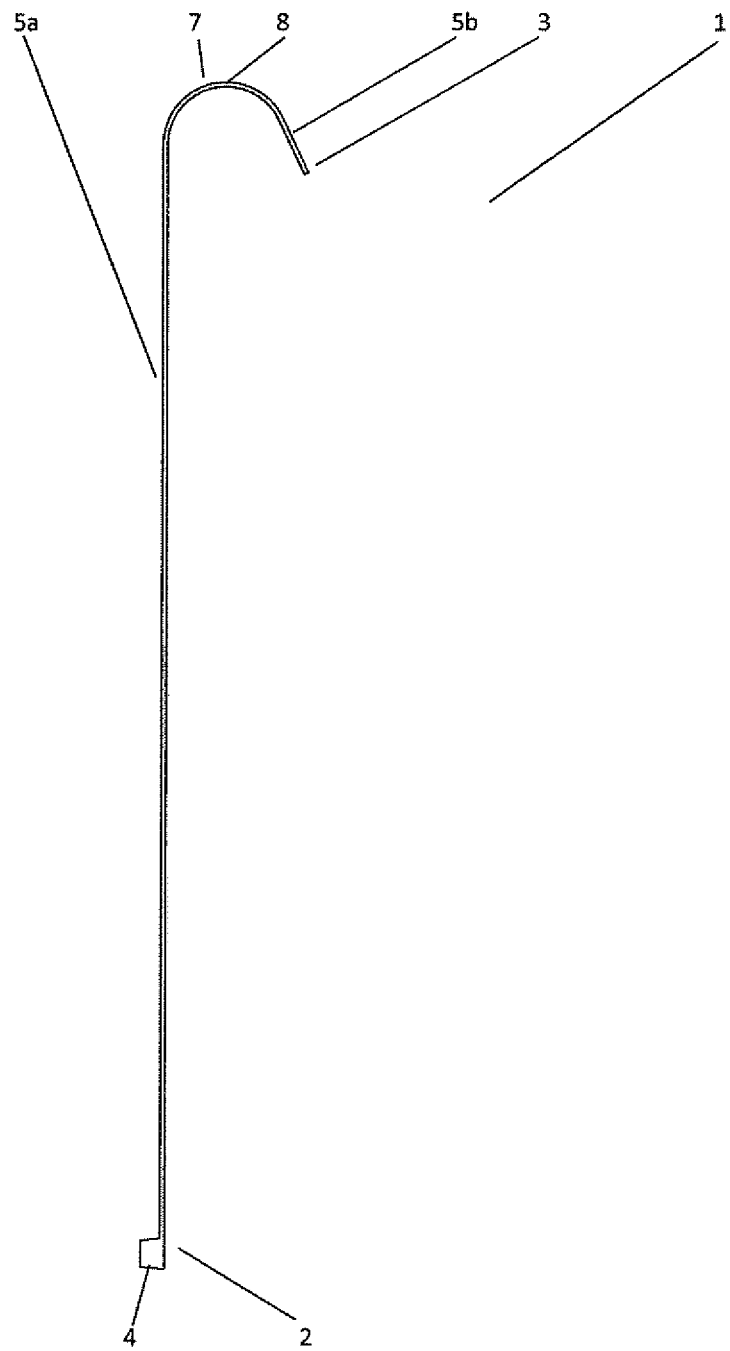
FIG. 1 is plan view of a cable tie made in accordance with the present invention.
Figure 2:
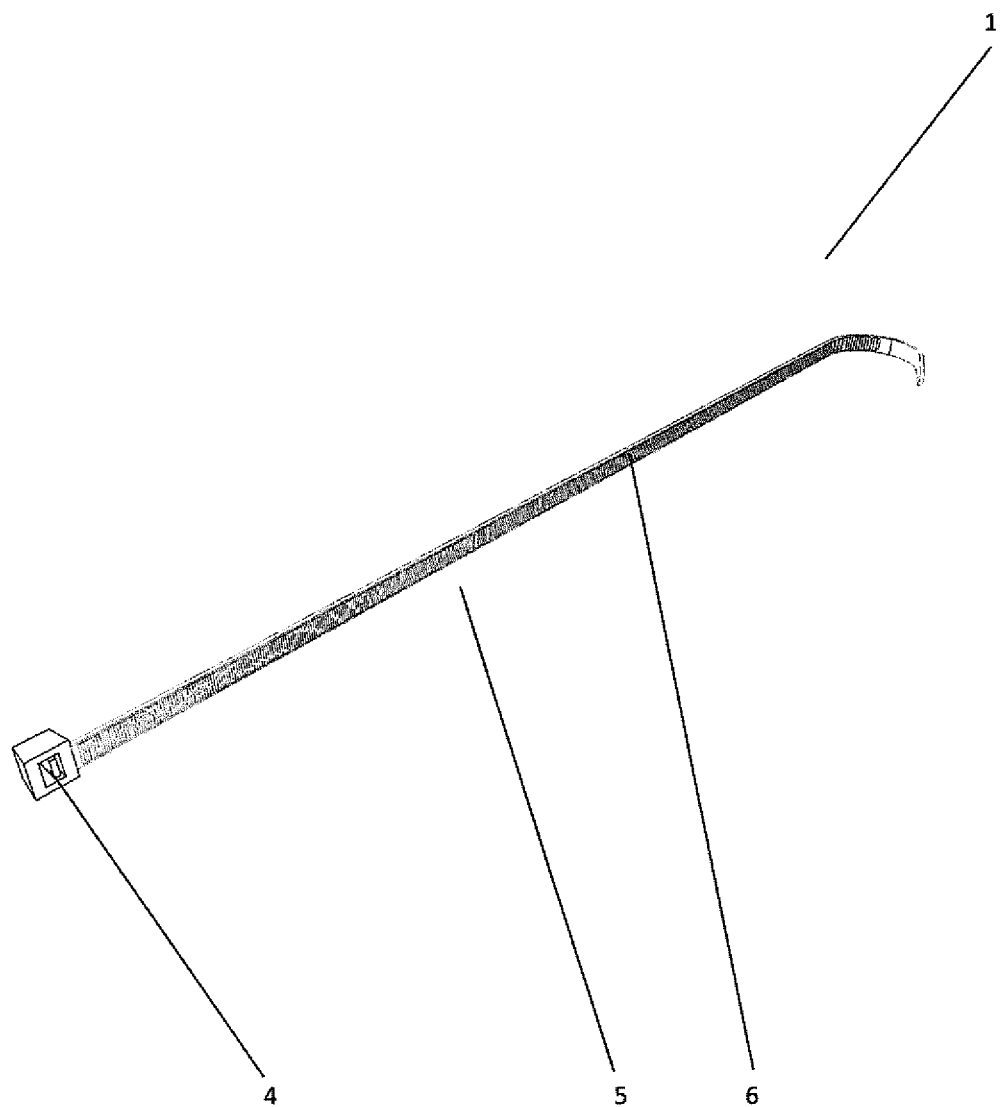
FIG. 2 is a perspective view of the cable tie of FIG. 1.
Figure 6:
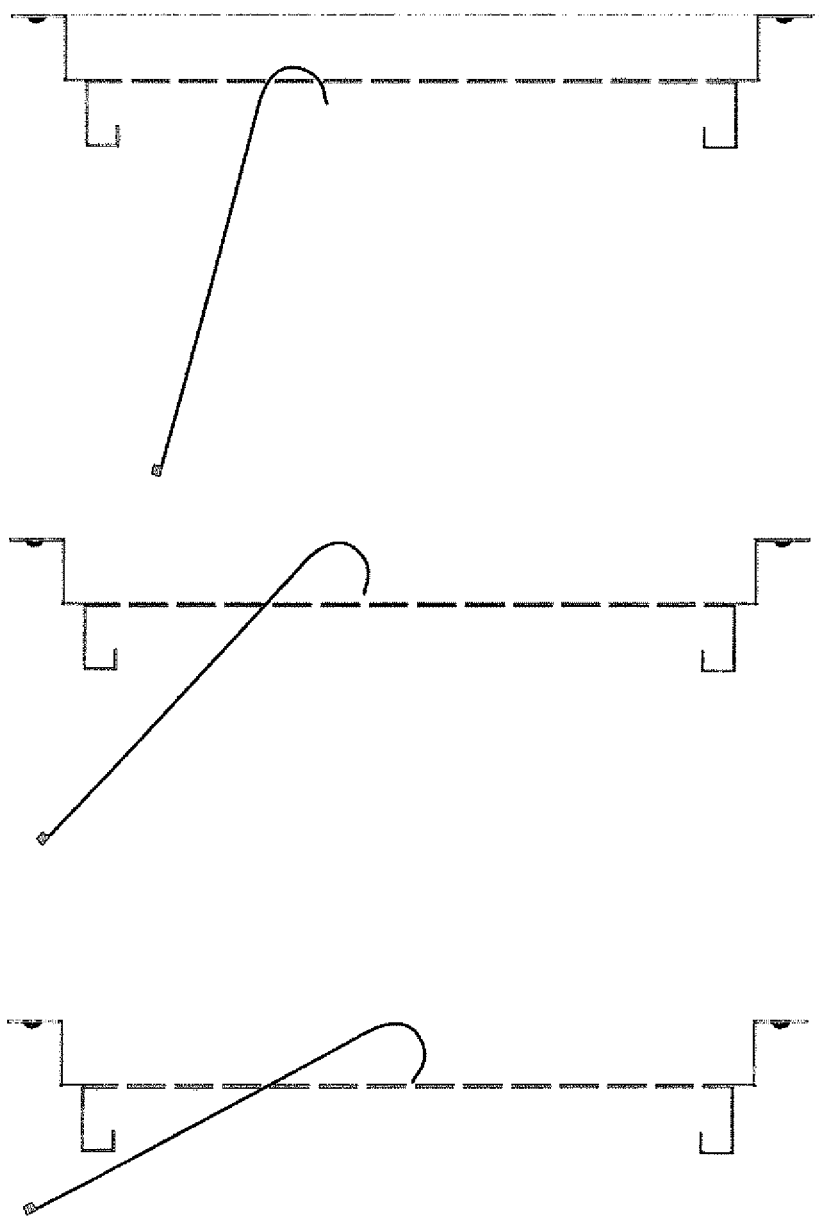

FIG. 6 comprises three cross-sectional views of the cable tie of FIG. 1 in use with a cable tray.

A cable tie 1 comprises a strap 5 having a first end 2 and a second, free end, 3.

Lock 4 is located at first end 2. Free end 2 is configured to be threaded through lock 4 such that teeth 6 located along the length of strap 5 engage with lock 4 in the manner of a standard cable tie.

When cable tie 1 is unused and is at rest strap 5 comprises a U-shaped curve 7 having a turning point 8, and which may be considered to separate two portions of strap 5.

First portion 5a of strap 5 is substantially linear and extends between lock 4 and curve 7.

Second portion 5b of strap 5 is substantially linear and extends between free end 3 and curve 7.

Figure 3:
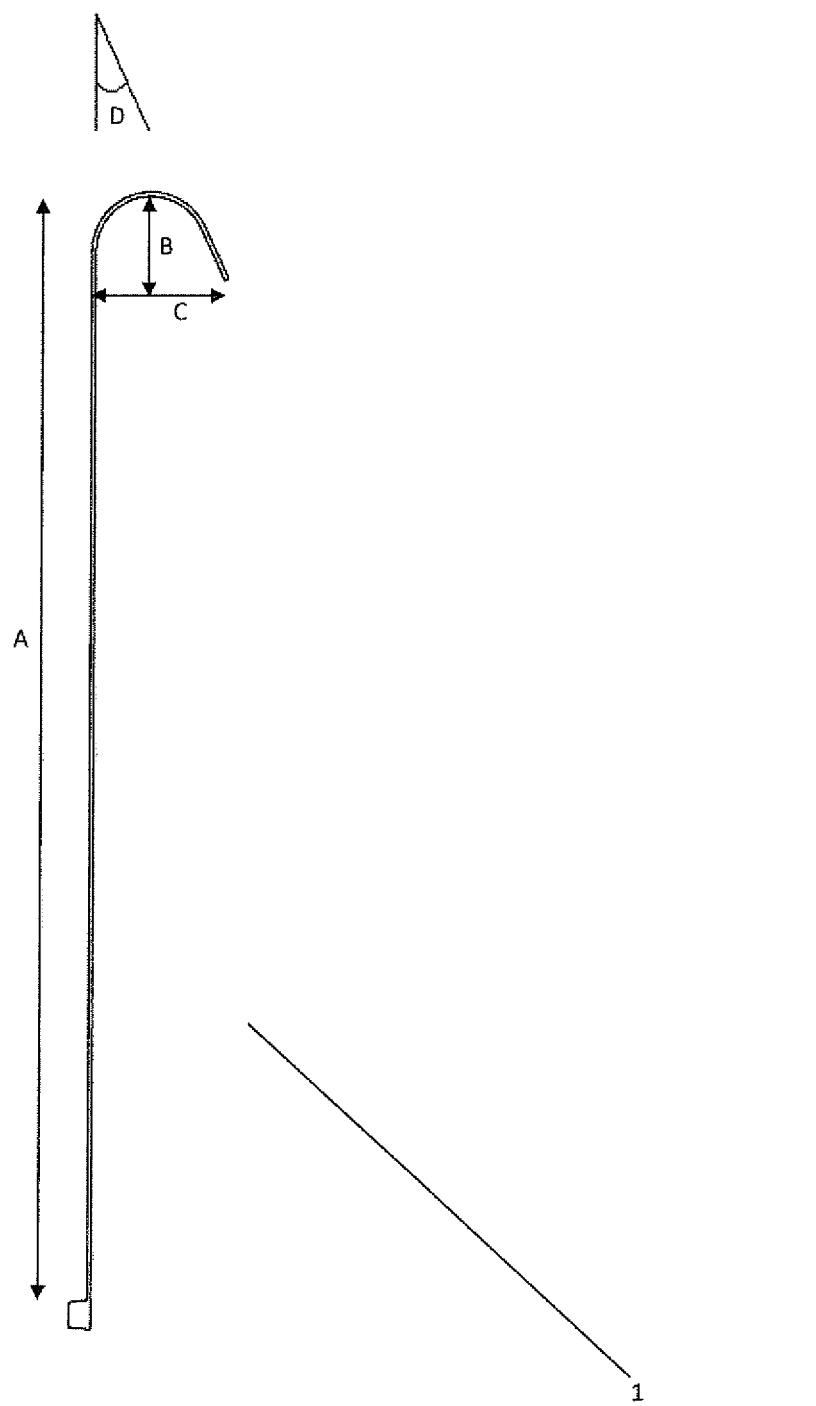
FIG. 3 is a view of the cable tie of FIG. 1 illustrating its dimensions.

As illustrated in FIG. 3 when first portion 5a Is in a linear arrangement the distance between turning point 8 of curve 7 and lock 4 may be measured parallel to the longitudinal axis of first portion 5a as distance A and a second parallel measurement B may be taken in respect of the distance between turning point 8 and free end 3.

Distance A is approximately 30 cm and distance B is approximately 3 cm.

The distance between free end 3 and first portion 5a when measured in a direction substantially perpendicular to the longitudinal axis of first portion 5a is illustrated as distance C in FIG. 3. This is distance is approximately 4 cm.

In FIG. 3 the acute angle at which second portion 5b extends relative to first portion 5a is labelled D.

In the present embodiment second portion 5b is angled to first portion 5a at an acute angle of around 25 degrees.

Figure 4:
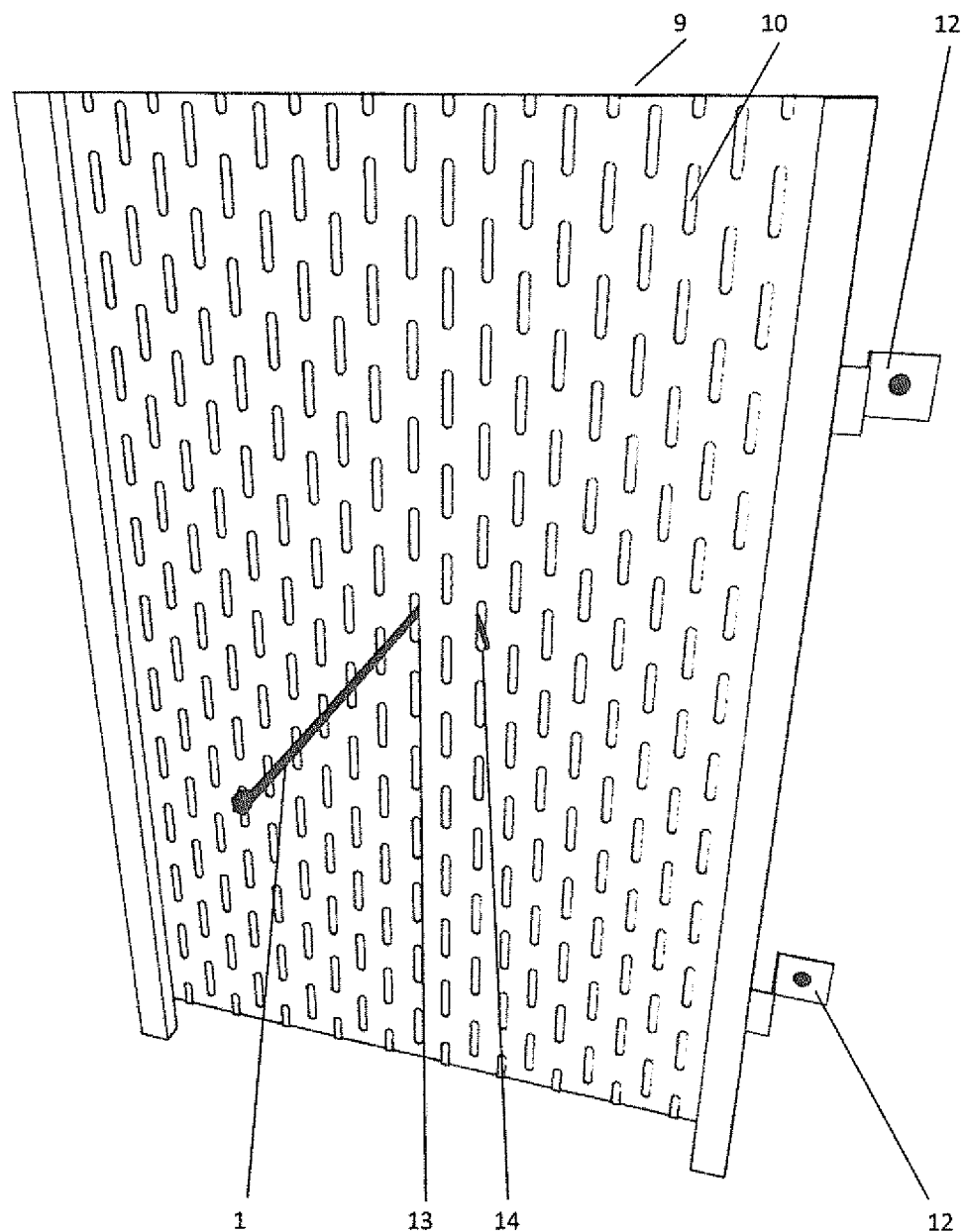
FIG. 4 is a view of the cable tie of FIG. 1 in use with a cable tray.
Figure 5:
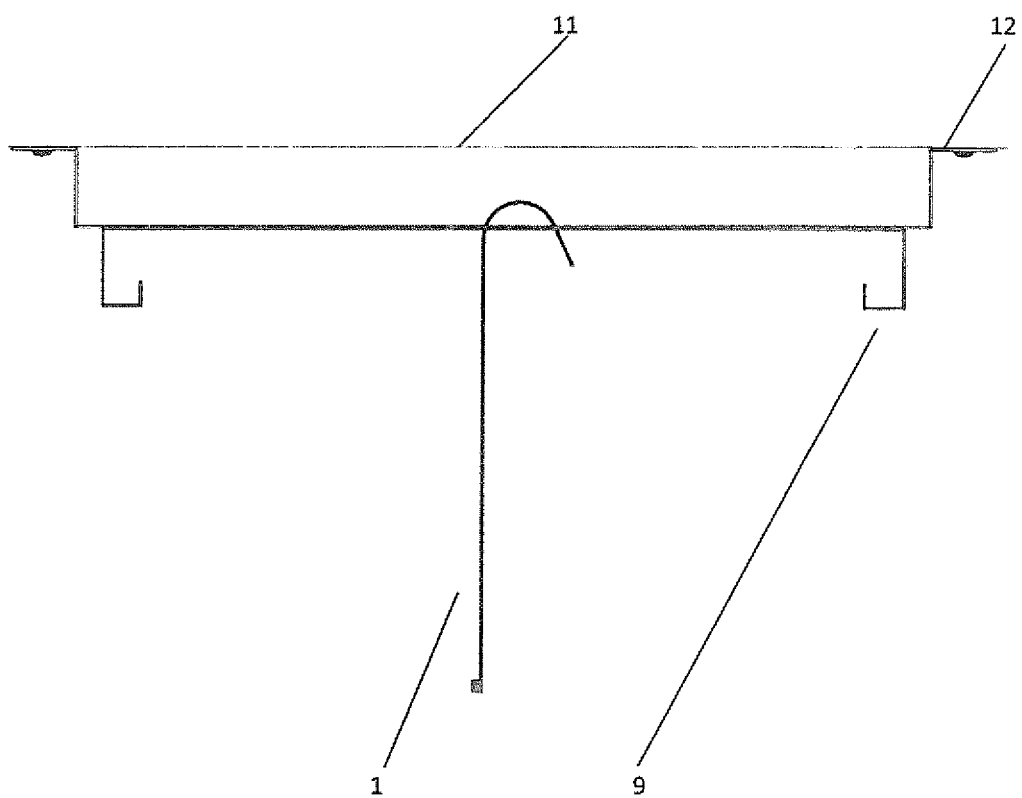
FIG. 5 is a cross-sectional view of FIG. 4

Turning to cable tie 1 in use, FIG. 4 illustrates a cable tray 9 comprising a plurality of apertures 10, which are spaced apart in each horizontal row (as depicted in FIG. 4) by approximately 4 cm.

Cable tray 9 is attached to surface 11 by means of stand off brackets 12 that hold the rear of cable tray 9 approximately 2.5 cm from wall surface 11.

A user wishing to secure an electrical cable (not shown) to cable tray 9 inserts free end 2 of cable tie 1 into first aperture 13. Owing to distance B being small relative to distance A only a small length of cable tie 1 must be threaded through first aperture 13 before free end 2 protrudes from adjacent aperture 14.

A user may then grasp free end 2 of cable tie 1, encircle the electrical cable(s) to be secured and thread free end 2 of cable tie 1 through lock 4 so as to fasten cable tie 1 as a loop.

By varying distances A, B and C and the acute angle at which the second portion of a cable tie extends from the first portion of the cable tie different tiers may be specifically adapted for different cable trays.

However, advantageously the dimensions of the embodiment cable tie 1 allow for cable tie 1 to be used with most regular cable trays and stand off brackets. Slots on cable trays are in general spaced apart by around 25 mm.

As illustrated in FIG. 6 a cable tie 1 made in accordance with the present invention is capable of being inserted through slots that are 25 mm apart, 50 mm apart and even 75 mm apart.

Cable tie 1 is capable of being inserted through such a range of slots owing to both the ratio of the lengths of first and second portions and the acute angle between first portion 5a and second portion 5b.

Whilst a range of acute angles may provide advantages over the prior art it has been found that angles of between 15 and 35 degrees, between 20 and 30 degrees and around 25 degrees are particularly beneficial angles as they allow a cable tie to be inserted through a plurality of differently spaced slots depending upon the needs of a user.

Many variations are possible without departing from the scope of the present invention as defined in the appended claims.

The invention claimed is:

1. A cable tie comprising:
   a strap having a lock at a first end and a second end configured to be threaded through the lock such that teeth on the strap are engaged by the lock;
   the strap having a first portion extending from the lock and a second portion joined to the first portion by a pre-formed curve in the strap; characterized by:
   the second portion extending from the curve to the second end, with at least a distal section of the second portion adjacent the second end being angled away from the first portion at an acute angle; wherein
   when measured parallel to the longitudinal axis of the first portion there is a first distance between the curve's turning point and the first end of the strap and a second distance between the curve's turning point and the second end of the strap;
   the first distance is at least 5 times greater than the second distance.

2. The cable tie of claim 1 wherein the first distance is at least 6 times, at least 7 times, at least 8 times, at least 9 times or at least 10 times greater than the second distance.

3. The cable tie of claim 1 wherein the distance between the second end and the first portion when measured in a direction substantially perpendicular to the longitudinal axis of the first portion is between 3 and 5 cm, or is between 3.5 and 4.5 cm, or is around 4 cm.

4. The cable tie of claim 1 wherein the second distance is between 1 and 5 cm, or is between 2 and 4 cm, or is between 2.5 and 3.5 cm, or is around 3 cm.

5. The cable tie of claim 1 wherein the first distance is between 20 and 40 cm, is between 25 and 35 cm, or is around 30 cm.

6. The cable tie of claim 1 wherein the second portion is angled to the first portion at an acute angle of less than 75 degrees, or of less than 60 degrees, or of less than 45 degrees, or of less than 30 degrees, or of less than 25 degrees.

7. The cable tie of claim 1 wherein the second portion is angled to the first portion at an acute angle of around 25 degrees.

8. The cable tie of claim 1 wherein the second portion is angled to the first portion at an acute angle of more than 10 degrees, more than 15 degrees, or more than 20 degrees.

9. The cable tie of claim 1 wherein the first portion is joined to the second portion by a U-shaped curve or a V-shaped curve.

10. The cable tie of claim 1 wherein a distal section of the second portion adjacent the second end is substantially linear.

11. The cable tie of claim 1 wherein at least 25% of the second portion is substantially linear, at least 50% of the second portion is substantially linear or at least 75% of the second portion is substantially linear.

12. The cable tie of claim 1 wherein the second portion is substantially linear.

13. A method of securing a cable to a cable tray comprising the steps of:
   providing a cable tie made in accordance with any preceding claim 1;
   inserting the second end of the cable tie through first and second apertures on the cable tray;
   threading the second end of the cable tie through the lock.

14. The method of claim 13 wherein the cable tray is attached to a surface by means of stand off brackets.

* * * * *